United States Patent [19]

Runkle et al.

[11] Patent Number: 5,742,515
[45] Date of Patent: Apr. 21, 1998

[54] ASYNCHRONOUS CONVERSION METHOD AND APPARATUS FOR USE WITH VARIABLE SPEED TURBINE HYDROELECTRIC GENERATION

[75] Inventors: Mark A. Runkle, Schenectady, N.Y.; Donald Gordon McLaren; Glenn Henry Ardley, both of Peterborough, Canada; Einar V. Larsen, Charlton, N.Y.; Konrad Weeber, Ennismore, Canada

[73] Assignee: General Electric Co., Schenectady, N.Y.

[21] Appl. No.: 550,940

[22] Filed: Oct. 31, 1995

Related U.S. Application Data

[63] Continuation-in-part of Ser. No. 426,201, Apr. 21, 1995, abandoned.

[51] Int. Cl.⁶ .................................................... F01D 15/10
[52] U.S. Cl. ........................ 364/494; 290/40 C; 290/52
[58] Field of Search ........................ 364/492, 493, 364/494, 495; 290/40 C, 52, 54; 307/118, 120, 87; 318/799, 800, 806; 388/929; 415/1, 13, 24

[56] References Cited

U.S. PATENT DOCUMENTS

| | | |
|---|---|---|
| 3,471,708 | 10/1969 | Rauhut et al. . |
| 3,694,728 | 9/1972 | Kanngiesser et al. .............. 363/51 |
| 3,701,938 | 10/1972 | Chadwick ......................... 363/51 |
| 3,836,837 | 9/1974 | Rauhut ............................. 363/150 |

(List continued on next page.)

FOREIGN PATENT DOCUMENTS

| | | |
|---|---|---|
| 2 170 686 A | 10/1996 | Canada . |
| 1 157 885 | 7/1969 | United Kingdom . |
| 2 055 515 | 3/1981 | United Kingdom . |

OTHER PUBLICATIONS

Goto et al., "Power System Stabilizing Control By Adjustable Speed Pumped Storage Power Station Using Stabilizing Signals", CIGRE Symposium Tokyo 1995, pp. 1–6.

Puchstein, Llody, and Conrad, *Alternating–Current Machines*, 3rd Edition, John Wiley & Sons, Inc., New York, pp. 425–428, particularly Fig. 275 on p. 428, 1954.

Kron, *Equivalent Circuits of Electric Machinery*, John Wiley & Sons, Inc., New York, pp. 150–163, particularly Fig. 9.5a on p. 156, no date.

Larsen, Einar V., et al, "Specification of AC Filters For HVDC Systems", 1989.

"Rotary Converters", Westinghouse Electric & Manufacturing Company, Circular No. 1028, Apr. 1903.

"Inductrol Voltage Regulators", General Electric Company, Publication 607C, pp. 29–30, Jun. 1974.

Enrique Lopez P., et al "Control and Planning of 50/60 Hz Industrial System Load Flows", Aug. 1990, Proceedings of the Colloquium in S. America, Argentina, Brazil, Chile, Uruguay, pp. 162–167.

*Primary Examiner*—Ellis B. Ramirez
*Assistant Examiner*—Eric W. Stamber
*Attorney, Agent, or Firm*—Nixon & Vanderhye

[57] ABSTRACT

A hydroelectric power generation system (20) generates electrical power for an electrical utilization system (72). A controller (42) obtains a requested output electrical power level from a hydro-turbine unit (70) by using a signal indicative of water head ($h_{meas}$) to control speed of an asynchronous rotary converter (50) coupled to the hydro-turbine unit and to control gate position of the hydro-turbine unit. The requested output electrical power level is applied from the hydro-turbine unit via the rotary converter to the electrical utilization system. In one embodiment, the controller (42B) accesses an updatable memory wherein Hydraulic Hill Chart information is stored. In another embodiment, the controller (42C) also includes a real-time automatic governor which uses a signal indicative of ac transmission frequency to the electrical utilization system to control the output electrical power level of the rotary converter.

20 Claims, 8 Drawing Sheets

U.S. PATENT DOCUMENTS

| | | | |
|---|---|---|---|
| 4,019,115 | 4/1977 | Lips | 363/65 |
| 4,179,729 | 12/1979 | Stanton et al. | 363/175 |
| 4,238,822 | 12/1980 | Schade | 363/107 |
| 4,249,237 | 2/1981 | Ronk et al. | 363/150 |
| 4,251,736 | 2/1981 | Coleman | 307/46 |
| 4,430,574 | 2/1984 | Ogiwara | 290/52 |
| 4,441,029 | 4/1984 | Kao | 290/52 |
| 4,445,049 | 4/1984 | Steigerwald | 307/45 |
| 4,489,261 | 12/1984 | Hartwig et al. | 318/700 |
| 4,490,808 | 12/1984 | Jasmin | 364/495 |
| 4,503,377 | 3/1985 | Kitabayashi et al. | 318/807 |
| 4,517,471 | 5/1985 | Sachs | 307/67 |
| 4,625,125 | 11/1986 | Kuwabara | 290/52 |
| 4,683,718 | 8/1987 | Larsson | 415/24 |
| 4,694,189 | 9/1987 | Haraguchi et al. | 290/40 C |
| 4,753,827 | 6/1988 | Shiozaki et al. | 318/798 |
| 4,754,156 | 6/1988 | Shiozaki et al. | 290/40 C |
| 4,788,647 | 11/1988 | McManus et al. | 364/494 |
| 4,794,544 | 12/1988 | Albright et al. | 364/494 |
| 4,804,900 | 2/1989 | Soeda | 318/719 |
| 4,806,781 | 2/1989 | Hochstetter | 290/52 |
| 4,816,696 | 3/1989 | Sakayori et al. | 290/52 |
| 4,823,018 | 4/1989 | Kuwabara et al. | 290/40 C |
| 4,870,558 | 9/1989 | Luce | 363/87 |
| 4,920,277 | 4/1990 | Kuwabara et al. | 290/40 C |
| 4,922,124 | 5/1990 | Seki et al. | 363/87 |
| 4,941,079 | 7/1990 | Ooi | 363/132 |
| 4,992,721 | 2/1991 | Latus | 322/10 |
| 4,994,684 | 2/1991 | Lauw et al. | 290/52 |
| 5,111,377 | 5/1992 | Higasa et al. | 363/95 |
| 5,239,251 | 8/1993 | Lauw | 318/767 |
| 5,341,280 | 8/1994 | Divan et al. | 363/37 |
| 5,402,332 | 3/1995 | Kopf | 364/494 |
| 5,550,457 | 8/1996 | Kusase et al. | 322/29 |
| 5,608,615 | 3/1997 | Luce | 363/102 | es

ASYNCHRONOUS CONVERSION METHOD AND APPARATUS FOR USE WITH VARIABLE SPEED TURBINE HYDROELECTRIC GENERATION

This application is a continuation-in-part of U.S. patent application Ser. No. 08/426,201 filed Apr. 21, 1995 by Mark A. Runkle and entitled "INTERCONNECTION SYSTEM FOR ELECTRICAL SYSTEMS HAVING DIFFERING ELECTRICAL CHARACTERISTIC", now abandoned, and is related to simultaneously-filed U.S. patent application Ser. No. 08/550,991 entitled "INTERCONNECTION SYSTEM FOR TRANSMITTING POWER BETWEEN ELECTRICAL SYSTEMS", both of which are incorporated herein by reference.

BACKGROUND

1. Field of Invention

This invention pertains to hydroelectric power generation, and particularly to method and apparatus for improving performance of a hydroelectric power generation system.

2. Related Art and Other Considerations

In the generation of electrical power using hydro-turbines, hydro-turbine units are enclosed in a dam, with water (e.g., river or lake) flow through the dam being used to drive (e.g., rotate) the hydro-turbine unit. So driven, the hydro-turbine unit has a shaft speed which is proportional to the frequency of the electrical power output produced by the hydro-turbine unit. Typically the hydro-turbine unit is a synchronous machine, meaning that the average speed of normal operation of the hydro-turbine unit is exactly proportional to the frequency of the electrical utilization system to which it is connected.

The generation of electrical power using hydro-turbines presents complex technical and environmental issues. For example, if a hydro-turbine unit is operated at a constant speed, several problems may manifest. For example, the turbine may cavitate at high and low loads (e.g., high and low water flow rates). Additionally, pressure variations created by turbine buckets of a hydro-turbine unit may harm fish passing through the turbine. Moreover, hydro-turbine units operated at constant speed have numerous limitations, including restricted ability to affect power system frequency, slow active power adjustment, lower than optimum turbine efficiency, and a restricted active power operating range (which subsequently restricts the power system, water head and flow ranges).

Since the hydro-turbine unit is a synchronous machine, slowing down the shaft speed of the turbine also reduces the synchronous frequency of the output. A reduction in synchronous frequency of the hydro-turbine unit output is unacceptable when the hydro-turbine unit output is directly coupled to a user power grid.

Various efforts have been underway to achieve a variable speed hydro turbine. According to one effort, documented by Goto et al., "Power System Stabilizing Control By Adjustable Speed Pumped Storage Power Station Using Stabilizing Signals", CIGRE Symposium Tokyo 1995, the main hydro generator is modified to apply a variable-frequency current to the field winding via a cycloconverter-type of excitation system.

U.S. Pat. No. 4,743,827 to Shiozaki et al. discloses a variable speed hydro turbine wherein control is accomplished using power and speed measurements of the main hydro generator in a closed loop configuration. Closed loop operation presents e.g., dynamic stability concerns (at least in a short time frame after a request for power change).

What is needed, therefore, is a variable speed hydro turbine system which is efficient and stable.

SUMMARY

A hydroelectric power generation system generates electrical power for an electrical utilization system. The hydroelectric power generation system comprises a hydro-turbine unit which is driven to generate hydro-turbine output electrical power. An asynchronous rotary converter is coupled to receive the hydro-turbine output electrical power and is operated by a controller to yield a requested converter output electrical power level to the electrical utilization system.

In one embodiment, the controller uses a signal indicative of water head ($h_{meas}$) to control a speed of the rotary converter (and consequentially the hydro-turbine unit) and gate position of the hydro-turbine unit for yielding the requested converter output power level to the utilization system.

In another embodiment, the controller also includes a real-time automatic governor which uses a signal indicative of ac transmission frequency to the electrical utilization system to control the output electrical power level of the rotary converter.

Controlling the speed of the variable speed hydro-turbine unit involves using the signal indicative of water head to access an updatable memory wherein Hydraulic Hill Chart information is stored. To this end, in one embodiment a Hill Chart updater is provided.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1A:
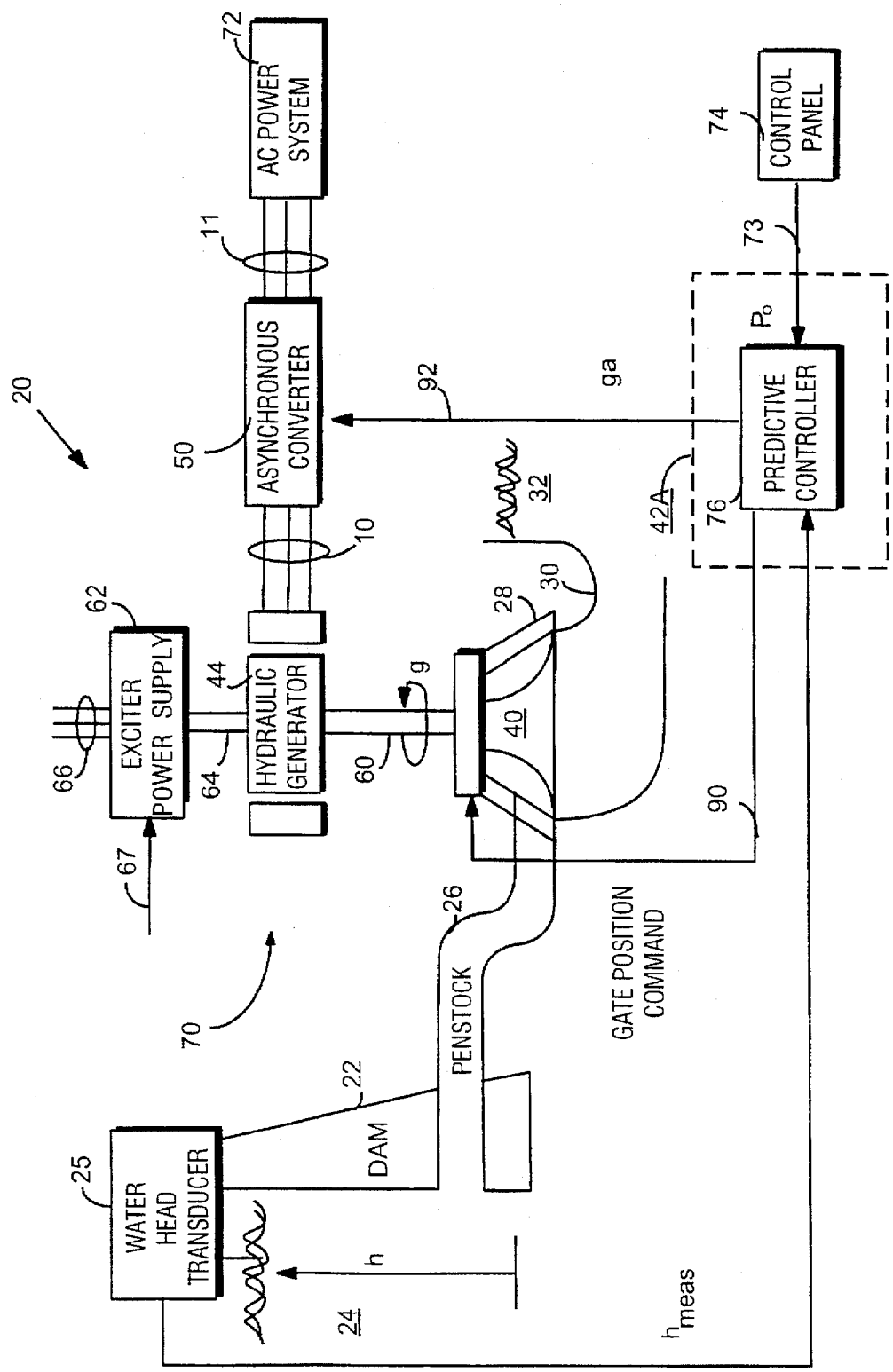
FIG. 1A is a schematic view of a hydraulic turbine/generator system according to a first embodiment of the invention.

FIG. 1A shows a hydraulic turbine/generator system 20 according to a first embodiment of the invention. System 20 is situated at a dam 22 which dams up water of a body of head water 24. Head water transducers 25 are mounted on or proximate dam 22 for ascertaining a height "h" of head water 24. In conventional manner, dam 22 has a penstock 26 through which water (from the body of head water 24) is channeled to turbine chamber 28. Draught tube 30 connects an outlet of turbine chamber 28 to a body of tail water 32.

System 20 includes turbine 40; control system 42A; hydraulic generator 44; and, asynchronous converter 50. Turbine 40 is situated in turbine chamber 28 in conventional fashion, and has an output shaft 60 which provides mechanical power flow to generator 44. Turbine 40 has a wicket gate controller 41 which controls positioning of an unillustrated wicket gate mechanism included in turbine 40.

Generator power supply 62 (also known as a generator field exciter) supplies field current on lines 64 to hydraulic generator 44. In conventional manner, generator power supply 62 receives its power input on lines 66 and an exciter input signal on line 67.

As termed herein, turbine 40 and hydraulic generator 44 comprise a hydro-turbine unit 70. Moreover, in view of its operation as explained hereinafter, asynchronous converter 50 is also known as an interface for coupling hydro-turbine unit 70 to an AC Power System such as utility or utilization system 72. In utilization system 72, electrical power may vary and is in a predetermined utilization electrical frequency range. A utility requirements signal (carried on 73 from a control panel 74) is indicative of a power level $P_0$ currently required by utilization system 72.

As shown in FIG. 1A, control system 42A includes predictive controller 76. The power order or power level signal $P_o$ from control panel 74 is applied as a first input to predictive controller 76. A second input signal to predictive controller 76 is the signal $h_{meas}$ applied from water head transducer 25. A first output of predictive controller 76 is a gate position command which is applied on line 90 to wicket gate controller 41. A second output signal $\omega_{go}$ of predictive controller 76, indicative of the desired rotational velocity of hydro-turbine unit 70 ($\omega_0$ being the actual rotational velocity of hydro-turbine unit 70), is applied to asynchronous converter 50 in the manner more particularly indicated hereinafter.

Figure 4:
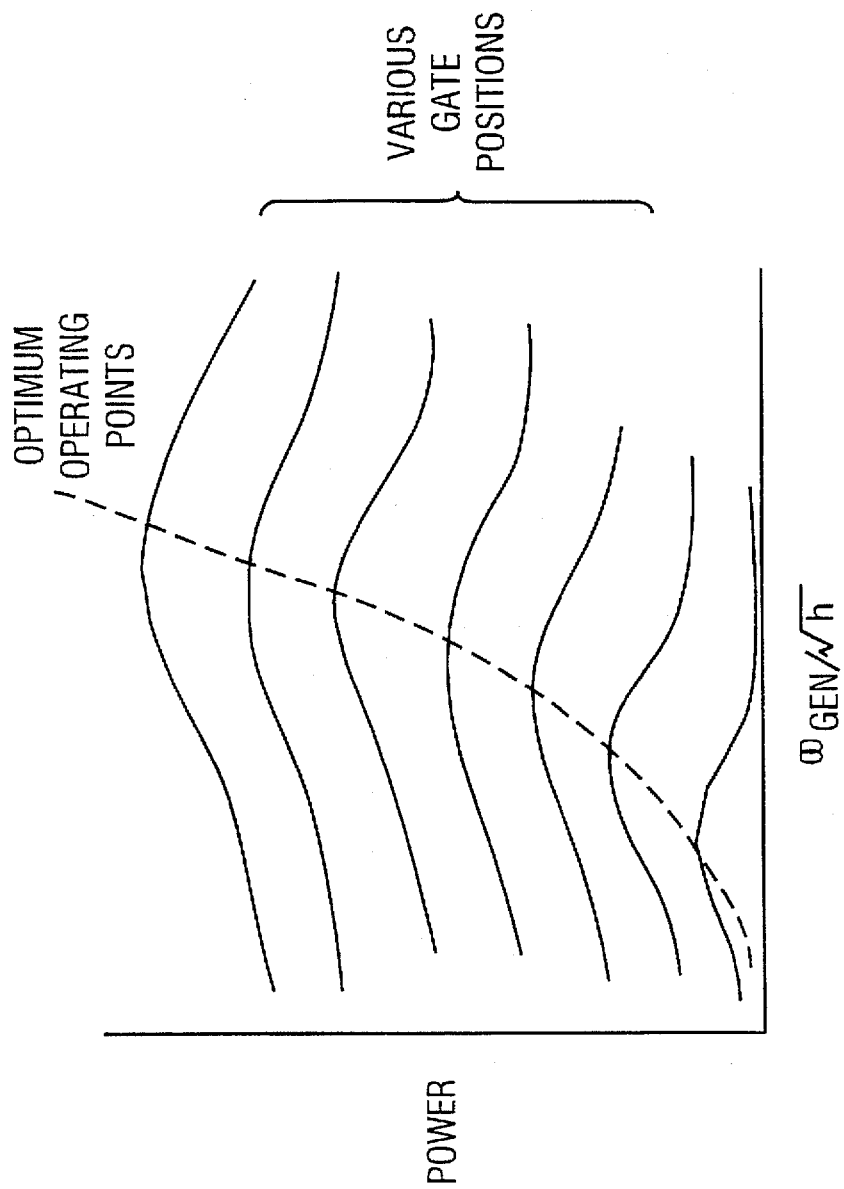
FIG. 4 is a Hill Chart utilized to explain principles of operation of the hydraulic turbine/generator system of the invention.

FIG. 4 shows a conventional "Hill Chart" of a type well known in the prior art and which is useful for an understanding of the function of the predictive controllers shown herein. The independent (horizontal) axis of the Hill Chart is proportional to the speed $\omega_{gen}$ of hydraulic generator 44 and inversely proportional to the square root of the water head "h" (as determined by water head transducer 25). The dependent (vertical) axis is power out of the generator. Each trace on the plot of the Hill Chart of FIG. 4 represents a different position of the wicket gate as governed by wicket gate controller 41. For each gate position and water head measurement, there is an optimum value of speed to maximize power.

Figure 5:
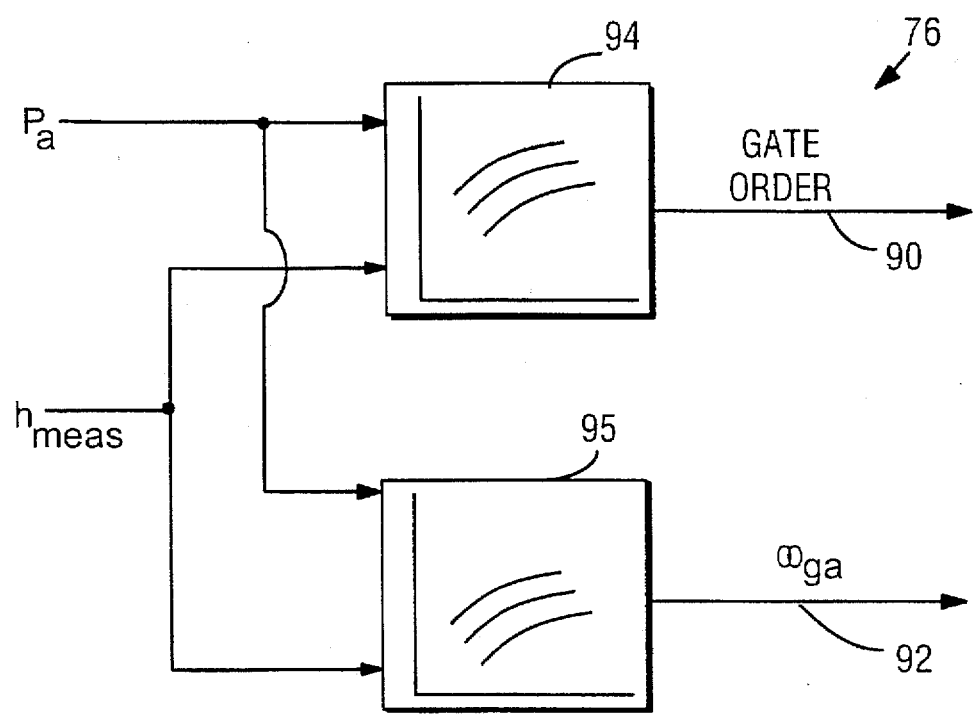
FIG. 5 is a schematic diagram of functions performed by a predictive controller included in a control system of the hydraulic turbine/generator system of the invention.

FIG. 5 illustrates functions performed by predictive controller 76. As indicated previously, predictive controller 76 receives the head water measurement signal $h_{meas}$ from water head transducer 25 and the ordered power signal $P_o$ (e.g., from panel 74). Using these two input signals, predictive controller 76 consults a first look-up table 94 to obtain a value "gate order" for use as the gate position command to apply on line 90 to wicket gate controller 41, and consults a second look-up table 95 to obtain the desired rotational velocity signal $\omega_{go}$ for application on line 92 and for use in driving asynchronous converter 50.

It will be understood by the man skilled in the art that, in one embodiment, predictive controller 76 comprises a processor with look-up tables 94 and 95 being stored in memories such as one or more read only memories (ROMs).

The gate position command is applied on line 90 to gate wicket controller 41. The man skilled in the art understands how wicket gate controller 41 functions to control positioning of the wicket gate mechanism included in turbine 40.

The output signal $\omega_{go}$ applied on line 92 from predictive controller 76 to asynchronous converter 50 is the ordered speed of the hydraulic generator 44. In response to output signal $\omega_{go}$, asynchronous converter 50 makes an ac voltage of the ordered frequency. Since the hydraulic generator 44 is a synchronous type machine, the speed of hydraulic generator 44 will be exactly proportional to the ac frequency of the 3-phase lines 10o Thus, setting the frequency order to asynchronous converter 50 for its connection to 3-phase lines 10 is sufficient to implement speed regulation of hydraulic generator 44 (i.e., there is no need to measure shaft speed of hydraulic generator 44 in the embodiment of FIG. 1A).

Figure 1B:
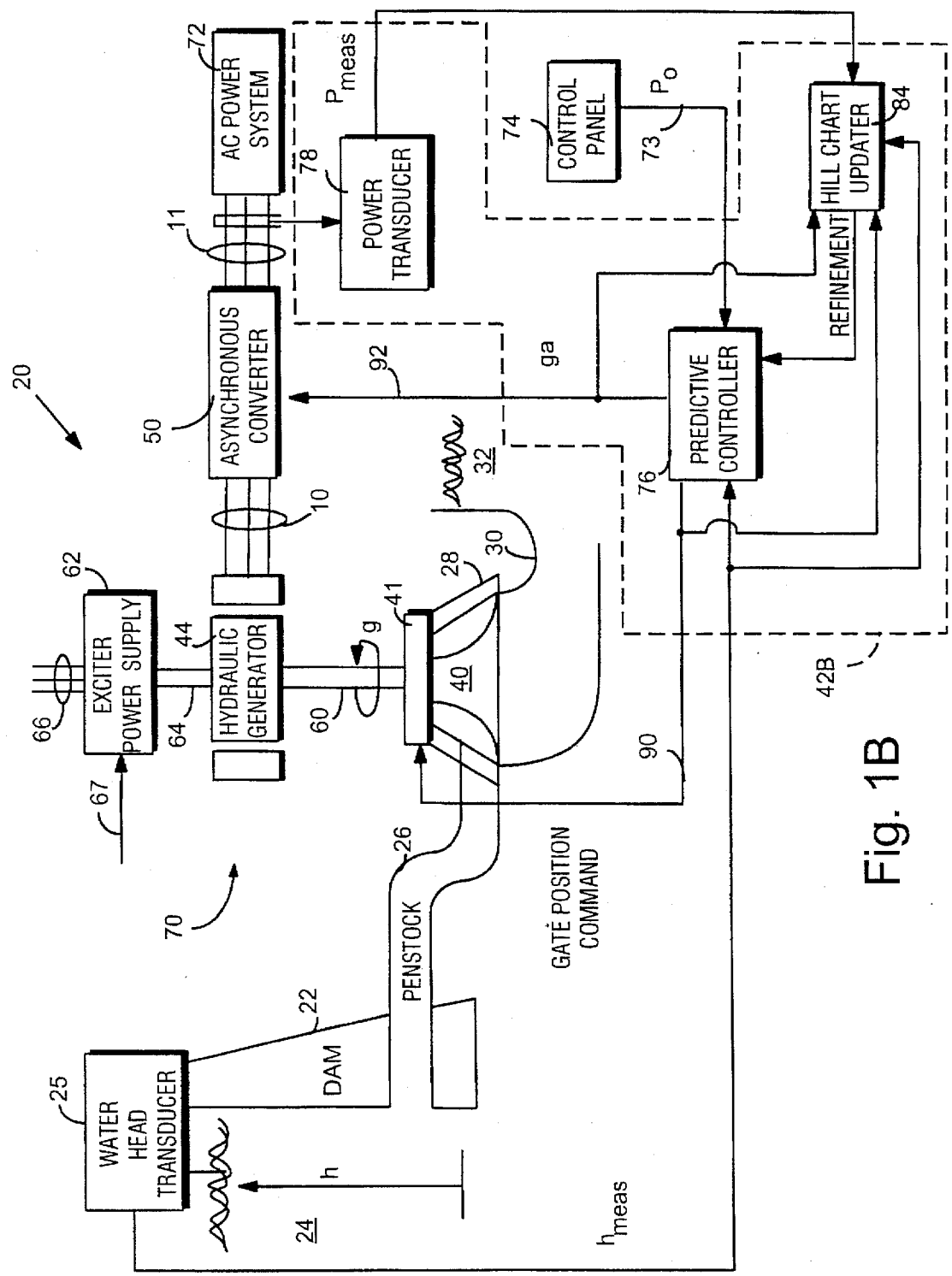
FIG. 1B is a schematic view of a hydraulic turbine/generator system according to a second embodiment of the invention.

The embodiment of FIG. 1B differs from the embodiment of FIG. 1A by having control system 42B rather than control system 42A. In particular, control system 42B includes power transducer 78 and Hill Chart Updater 84 in addition to predictive controller 76. Power transducer 78 monitors power on the three-phase lines connecting asynchronous converter 50 to AC power (utility) system 72 and outputs a signal $P_{meas}$ to Hill Chart Updater 84.

Figure 6A:
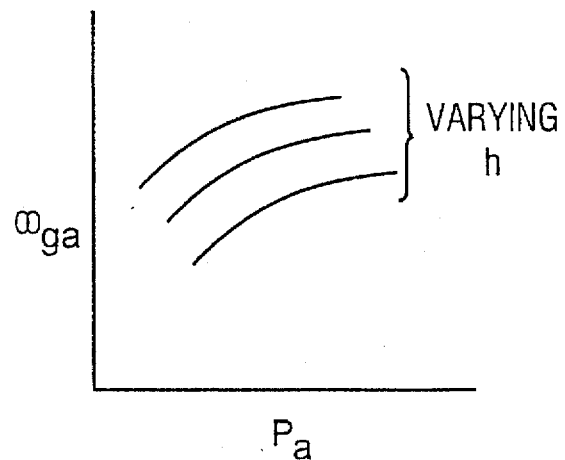
FIG. 6A and FIG. 6B are graphs reflecting tables stored in the predictive controller which are used for generating output signal $\omega_o$ and a gate position or gate order command.
Figure 6B:
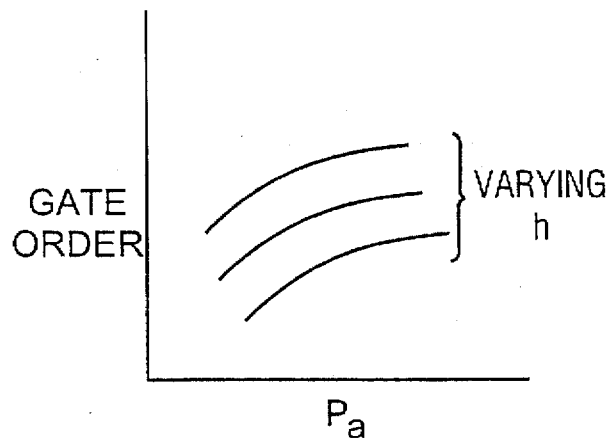

Hill Chart Updater 84 updates values stored in look-up tables 94 and 95 (see FIG. 6A and FIG. 6B) based on on-line measurements. In this regard, Hill Chart Updater 84 utilizes the measured power output of asynchronous converter 50 (signal $P_{meas}$), as well as the output signals (on lines 90 and 92) from predictive controller 76 and the signal $h_{meas}$ from water head transducer 25, to revise the Hill Chart information stored in tables 94 and 95 based on actual historical information of the hydroelectric facility.

Thus, Hill Chart updater 84 is connected to receive the measured power signal $p_{meas}$ from power transducer 78, as well as the gate position command outputted on line 90 from predictive controller 76, the signal outputted on line 92 from predictive controller 76, and the $h_{meas}$ signal outputted from water head transducer 25. Hill Chart Updater 84 outputs, to predictive controller 76, updating data as indicated by a line marked "refinement".

Figure 1C:
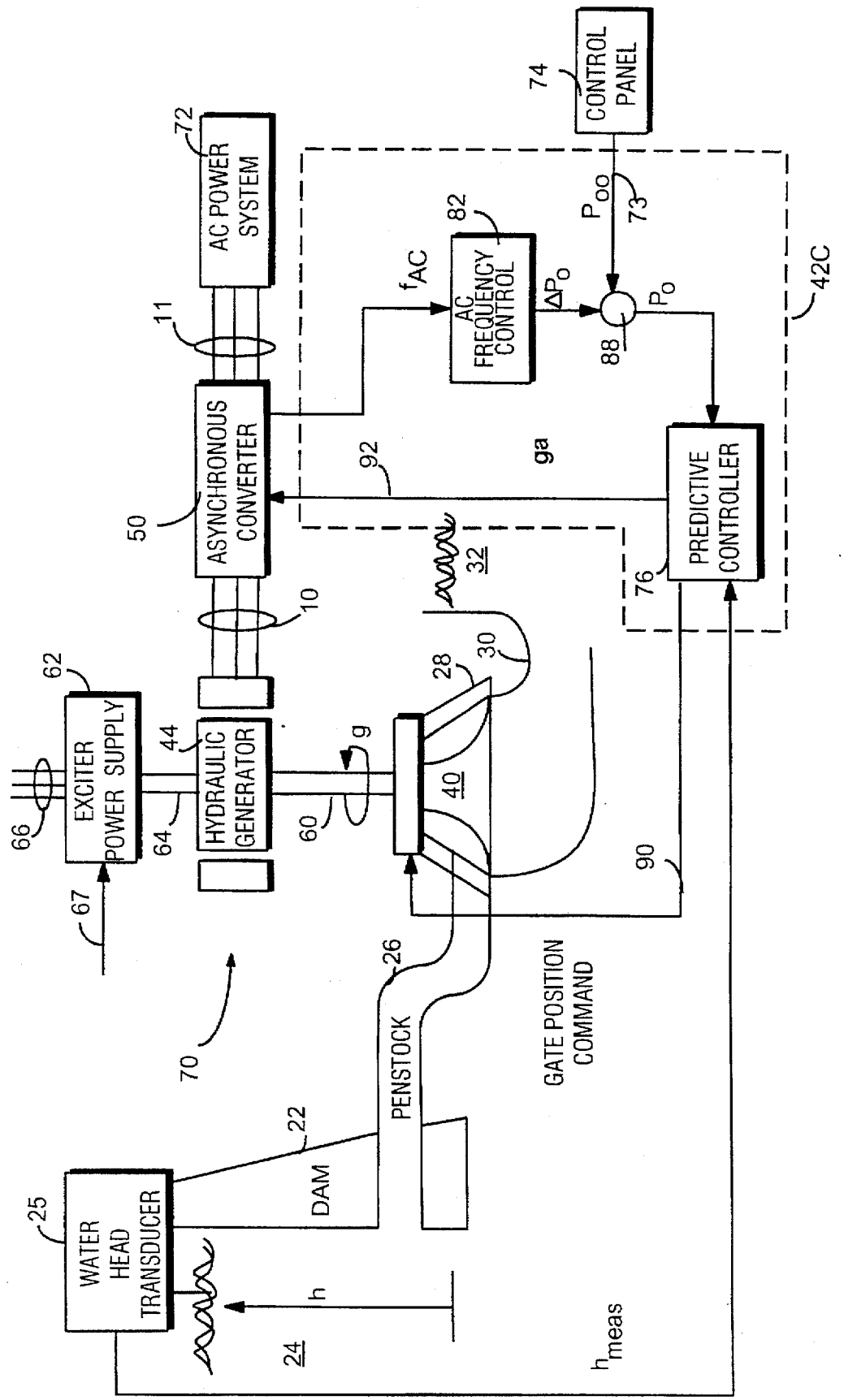
FIG. 1C is a schematic view of a hydraulic turbine/generator system according to a third embodiment of the invention.

The embodiment of FIG. 1C differs from the embodiment of FIG. 1A by having control system 42C rather than control system 42A. In particular, control system 42C includes (in addition to predictive controller 76) a governor comprising an AC frequency controller 82 and adder 88.

In the embodiment of FIG. 1C, frequency controller 82 receives a signal $f_{ac}$ from asynchronous converter 50 in the manner hereinafter described, the signal $f_{ac}$ being indicative of ac transmission frequency on the three-phase lines connecting asynchronous converter 50 to AC power (utility) system 72. Output signal $\Delta P_o$ from AC frequency controller 82 is applied to a first (plus) input terminal of adder 88. A second input (plus) terminal of adder 88 is connected to receive the ordered power signal (denominated as $P_{\infty}$ in the FIG. 1C embodiment) from control panel 74. Adder 88 produces a signal $P_o$ which is applied as a first input to predictive controller 76 and which, in the embodiment of FIG. 1C, serves as the value $P_0$ in FIG. 5 and FIG. 6A and FIG. 6B.

As in the previous embodiments, the second input signal to predictive controller 76 of FIG. 1C is the signal $h_{meas}$ applied from water head transducer 25. A first output of predictive controller 76 is a gate position command which is applied on line 90 to wicket gate controller 41. A second output of predictive controller 76 of FIG. 1C (i.e., signal $\omega_{go}$) is applied on line 92 to asynchronous converter 50.

It should be understood that the features of the embodiment of FIG. 1B and FIG. 1C are combinable in a further embodiment, thereby including both Hill Chart update and ac frequency control in a single embodiment.

Figure 2:
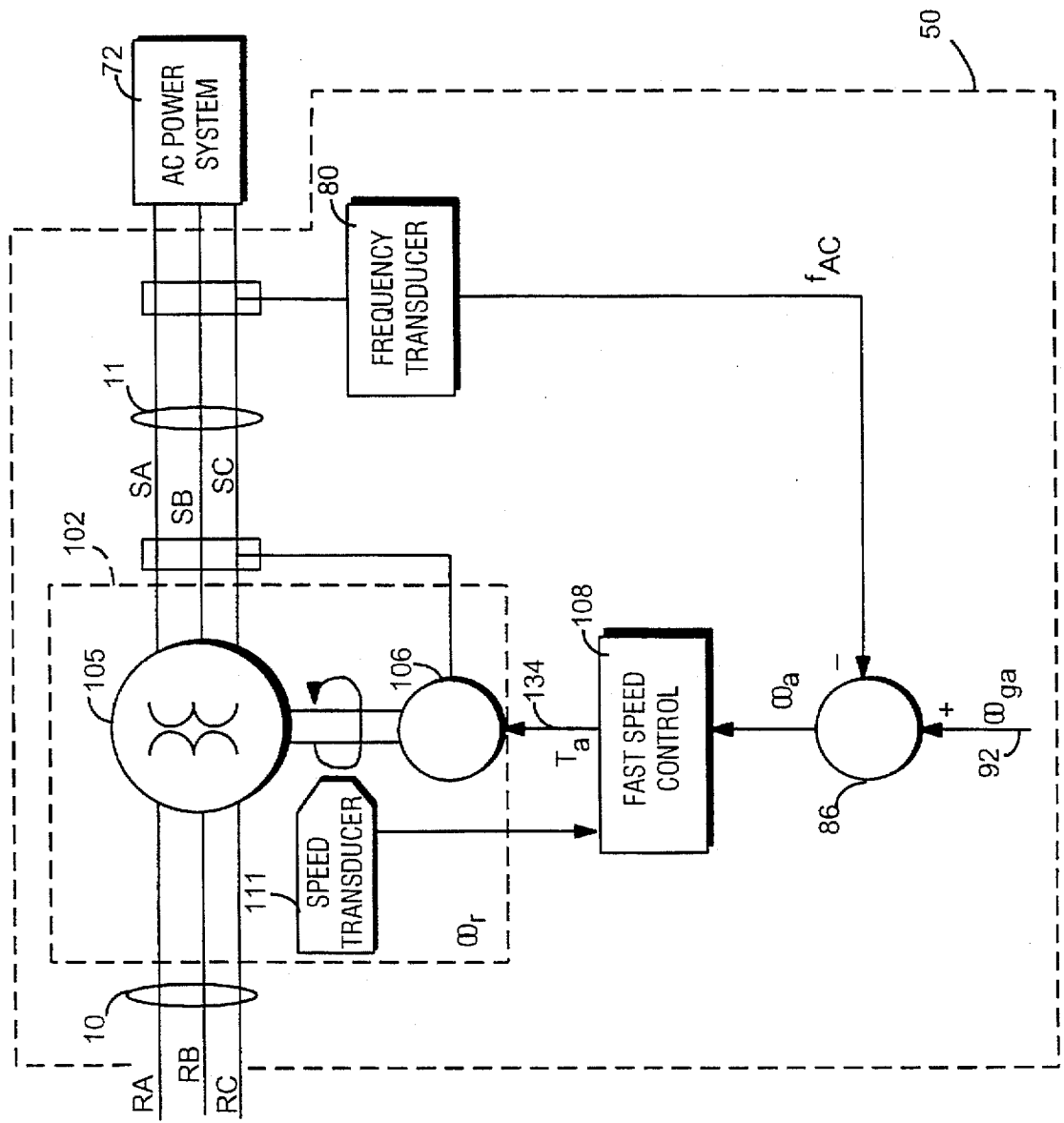
FIG. 2 is a schematic view of an asynchronous converter according to an embodiment of the invention.

FIG. 2 shows asynchronous converter 50 as including a variable frequency transformer 102 and a control system. The control system includes a fast speed control unit 108; a frequency transducer 80; and an adder 86. As described in more detail below with reference to FIG. 3, variable frequency transformer 102 is connected by 3-phase lines RA, RB, RC to hydraulic generator 44 and by 3-phase lines SA, SB, and SC to utility system 72. These correspond to 3-phase lines denoted as 10 and 11, respectively, in FIG. 1A, 1B, and 1C.

As shown in FIG. 2, variable frequency rotary transformer 102 includes both a rotary transformer assembly 105 and a torque control unit 106 (also known as the rotor drive section). Details of rotary transformer assembly 105 and torque control unit 106 are below described in more detail in connection with FIG. 3.

Frequency transducer 80 monitors ac frequency on the three-phase lines 11 connecting asynchronous converter 50 to AC power (utility) system 72 and outputs the signal $f_{ac}$ to a negative input terminal of adder 86 (and to AC frequency controller 82 in the embodiment of FIG. 1C) o Adder 86 receives the requested rotational velocity signal for hydraulic machine 44 (signal $\omega_{go}$ on line 92) and outputs signal $\omega_0$ to fast speed controller 108. An output signal $\omega_0$ of adder 86, i.e., $\omega_0 = \omega_{go} - f_{ac}$ is indicative of the desired rotational velocity of asynchronous converter 50 and accordingly is applied to asynchronous converter 50.

As also shown in FIG. 2, fast speed control unit 108 in turn receives a signal $\omega_r$ from speed transducer 111. Fast speed control unit 108 receives the signal $\omega_o$ (from predictive controller 76 via adder 86) and outputs a drive signal $T_o$ to torque control unit 106.

Figure 3:
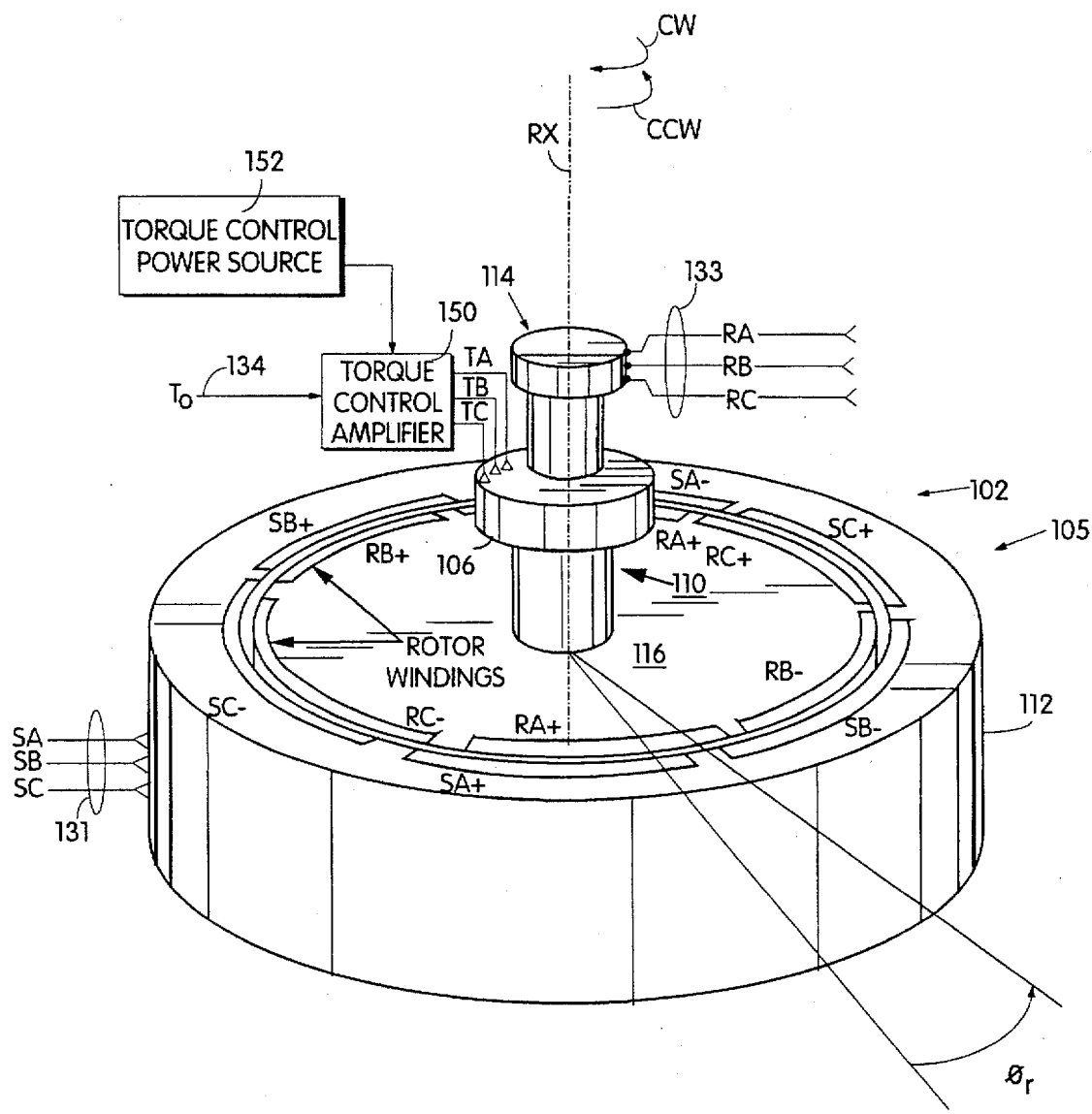
FIG. 3 is a partial schematic, partial perspective view of the asynchronous converter of FIG. 2.

As shown in more detail in FIG. 3, rotary transformer assembly 105 includes both a rotor subassembly 110 and a stator 112. Rotor subassembly 110 includes collector rings 114 (also known as slip rings) and rotor cage section 116. Three-phase lines RA, RB, RC leading from hydraulic generator 44 are connected to collector rings 114; three-phase lines SA, SB, and SC leading to utility system 72 are connected to stator 112. Rotor subassembly 110 has speed transducer 111 mounted proximate thereto for generating the angular velocity signal $\omega_r$ indicative of the angular velocity of the rotor.

As shown in FIG. 3 and understood by the man skilled in the art, in the illustrated embodiment rotary transformer assembly 105 is wound with a two-layer winding with sixty degree phase belts, with rotor windings being labeled as RA+, RC−, RB+, RA−, RC+, and RB− and stator windings labeled as SA+, SC−, SB+, SA−, SC+, and SB−. It should be understood that the invention is not limited to a sixty degree phase belt-wound system, rather the principles of the invention are applicable for rotary transformer assemblies of phase two and greater.

Rotor assembly 110 is rotatable about its axis RX in both clockwise direction CW and counter-clockwise direction CCW. Rotation of rotor assembly 110 is effected by rotor drive section 106.

Rotor drive section 106 is shown symbolically in FIG. 3 as a cylindrical section mounted on rotor assembly 110. Thus, rotor drive section 106 of FIG. 3 generally depicts various alternative and different types of drive mechanisms for causing rotation of rotor assembly 110. In some embodiments, rotor drive section 106 includes an actuator and some type of linkage (e.g., gearing and/or coupling) which interfaces with rotor assembly 110. For example, in one embodiment rotor drive section 106 comprises a worm gear drive arrangement. In other embodiments, rotor drive section 106 comprises an actuator such as a stepper motor acting through a radial (e.g., spur) gear, a direct drive arrangement, a hydraulic actuator turning a gear on rotor assembly 110, or a pneumatic actuator turning a gear on rotor assembly 110. In yet other embodiments, the function of the torque control unit is accomplished by providing two sets of windings on both the rotor and the stator of the rotary transformer assembly 105, a first set of windings on the rotor and stator having a different number of poles (e.g., 2 poles) than a second set of windings on the rotor and stator (e.g., 4 or more poles).

In operation, an operator sets the power order input signal (signal $P_o$ in the embodiments of FIG. 1A and FIG. 1B; signal $P_{oo}$ in the embodiment of FIG. 1C) in accordance with a predetermined power requirement of utility system 72. Setting power order input signal ($P_0$ or $P_{oo}$, as the case may be) can be accomplished by adjusting a knob or inputting data at the operator control panel or operator workstation 74 to generate the signal indicative of the ordered power.

Fast speed controller 108 receives both the requested or desired angular velocity signal $\omega_o$ and a measured angular velocity signal $\omega_r$. The requested angular velocity signal $\omega_o$ is generated by predictive controller 76 using its Hill Chart-based information. The measured angular velocity signal $\omega_r$ is obtained from speed transducer 111. Fast speed controller 108 generates a drive signal (also known as the torque order signal $T_o$) on line 134 so that $\omega_r$ promptly equals $\omega_o$. The man skilled in the art knows how to operate conventional motor drivers as fast speed controller 108 to use signals $\omega_r$ and $\omega_o$ to generate the drive signal $T_o$.

Thus, fast speed controller 108 operates to adjust the drive signal $T_o$ on line 134 to torque control unit 106 such that the actual speed $\omega_r$ of rotor assembly 110 follows the ordered speed $\omega_o$. The closed-loop bandwidth of fast speed controller 108 should exceed the highest natural oscillatory frequency of rotor assembly 110, including its reaction to the transmission network into which it is integrated, and is generally less than 100 rad/sec. Typically, the natural modes of oscillation will range from about 3 rad/sec through 50 rad/sec, and are usually less than 30 rad/sec. In connection with the bandwidth (speed of response) of fast speed controller 108, in the illustrated embodiment, a phase lag from a change in ordered speed $\omega_o$ to actual speed $\omega_r$ of rotor assembly 110 is less than 90 degrees for sinusoidal disturbances. Ensuring this bandwidth of response will in turn ensure that all such natural modes of oscillation will experience beneficial damping from the control system.

The magnitude of the drive signal $T_o$ on line 134 is used by rotor drive section 106 to increase or decrease the speed of rotor assembly 110 in order to achieve the desired speed of hydro machine 44.

As shown in FIG. 3, drive signal $T_0$ on line 134 is applied to torque control amplifier 150. Power is supplied to torque control amplifier 150 by torque control power source 152, whereby using drive signal $T_0$ on line 134 the torque control amplifier 150 outputs the three phase signals TA, TB, and TC to torque control unit 106. As used herein and in this art, TA refers collectively to TA+ and TA−, TB refers collectively to TB+ and TB−, and so forth.

The angular positioning $\theta_r$ of the rotor assembly 110 relative to the stator 112 is also shown in FIG. 3, being understood from conventional practice that $\theta_r$ is zero when RA+ lines up exactly with SA+.

Power transfer through asynchronous controller 50 is understood with reference to simultaneously-filed U.S. patent application Ser. No. 08/550,941 entitled "INTERCONNECTION SYSTEM FOR TRANSMITTING POWER BETWEEN ELECTRICAL SYSTEMS", which is incorporated herein by reference for showing, e.g., various types of mechanisms utilized for rotor drive section 106.

The real-time automatic governor for asynchronous converter 50, accomplished by Ac frequency controller 82 and adder 88, provides an automatic adjustment of order power input signal $P_{OO}$ depending upon actual real-time requirements of AC Power System 72. For example, if AC Power System 72 were, at any moment, not receiving enough power despite the order power signal $P_{OO}$, the frequency on lines 11 would decrease and such decrease would be sensed by frequency transducer 80 and compensated for by predictive controller 76 in response to signal $P_O$, so that a greater power level than that evoked by signal $P_{OO}$ would result. Conversely, if too much power were being supplied to AC Power System 72, the frequency on lines 11 would increase and such increase would be sensed by frequency transducer 80 and compensated for by predictive controller 76, so that a lesser power level than that evoked by signal $P_{OO}$ would result.

In the embodiment of FIG. 1C, the signal $P_O$ to predictive controller 76 is indicative of the requested power level, rather than the order power signal $P_{OO}$ ($P_O$ being a modification of $P_{OO}$ as explained above).

Thus, the present invention accomplishes variable speed with the conventional direct-current field winding on the main generator 44, varying the frequency of the ac current flowing in the stator of the main generator deviating from the nominal frequency of the AC power system 72 by an amount needed to achieve the desired speed variation (e.g., 55 Hz would yield a 110% speed on a generator nominally operated at 50 Hz). Moreover, the present invention achieves its objective of optimum hydraulic efficiency by measurement of water head and ac transmission system frequency only, with an open-loop control function based upon a "Hydraulic Hill chart" computed off line.

As another advantage, power-system frequency is controlled by measuring ac transmission system frequency and adjusting the power order to the main control function. Damping of power system oscillations is also provided via the fast speed controller 108.

Converter 50 thus can easily be used to retrofit existing hydrogenerator facilities. Limits of speed adjustability of each hydrogenerator facility will depend on mechanical stresses and the ability of other system components to perform their functions. At least one generator in any given dam complex can be equipped with converter 50, or just selected dam sites along a river requiring extra control capability.

Moreover, converter 50 provides a significant tool for power authorities who manage water resources. By uncoupling flow rate (through the turbine) with power demand, water levels can be adjusted accurately without wasting energy. Such accurate adjustment includes the ability to adjust for flood and/or drought conditions in different regions of the same river.

Converter 50 also addresses the issue of pumped storage control. Pumped storage hydroelectric typically involves a two reservoir system, one reservoir being at a higher elevation and another reservoir being at a lower elevation. Water is pumped to the higher reservoir, storing its potential energy until utilities encounter extraordinary peak demand conditions. The water is then released through hydroturbines to meet this peak demand. Severe drainage of the upper reservoir as occurs at peak demand requires pumping (at an off-peak time) of water back from the lower reservoir to the higher reservoir. During low reservoir conditions, converter 50 provides the advantage of fast response and reduced operating speed. By running slightly slower and using a smaller reserve margin, power authorities can optimize water conservation while maintaining a load response rate equal to their water gating rate.

Benefits of the present invention include lower environmental stress (saving fish, minimizing erosion, etc.) and superior water level control, particularly in multi-basin systems. This control improves usefulness of water supply both for recreational and agricultural aspects, such as irrigation.

While the invention has been particularly shown and described with reference to the preferred embodiments thereof, it will be understood by those skilled in the art that various alterations in form and detail may be made therein without departing from the spirit and scope of the invention. For example, whereas in the foregoing description a supply electrical system has been illustrated as being connected to collector rings 114 and a receiver electrical system has been illustrated as being connected to stator 112, it should be understood that these illustrated connections can be reversed.

The embodiments of the invention in which an exclusive property or privilege is claimed are defined as follows:

1. A method of transmitting electrical power from a hydro-turbine unit to an electrical utilization system, the method comprising:
    obtaining a signal indicative of water head;
    using the signal indicative of water head to control (1) gate position of a variable speed hydro-turbine unit and (2) rotor speed of an asynchronous rotary converter connected between the hydro-turbine unit and the electrical utilization system, whereby the asynchronous rotary converter generates an output signal to the variable speed hydro-turbine unit; and
    using output signal to control a rotational speed of a hydraulic generator included in the hydro-turbine unit and thereby obtain a requested power level to the electrical utilization system.

2. The method of claim 1, wherein controlling the speed of the variable speed hydro-turbine unit involves using the signal indicative of water head to access a memory wherein Hydraulic Hill Chart information is stored.

3. The method of claim 2, further comprising updating the memory wherein the Hydraulic Hill Chart information is stored.

4. The method of claim 1, further comprising:
    obtaining a signal indicative of ac transmission frequency to the electrical utilization system; and
    also using the signal indicative of ac transmission frequency to the electrical utilization system to control an output power level of the variable speed hydro-turbine unit.

5. An interface for coupling a hydro-turbine unit to an electrical utility, the hydro-turbine having a hydraulic generator for generating hydro-turbine output electrical power which is transmitted via the interface to the electrical utility, the interface comprising:
- a rotary converter coupled to the hydro-turbine unit for receiving the hydro-turbine output electrical power generated by the hydro-turbine unit and through which the hydro-turbine output electrical power is applied to the electrical utility; and
- a controller which operates the rotary converter so that a requested output electrical power level is obtained from the hydro-turbine unit for the electrical utility, the controller using a signal indicative of water head to control speed and gate position of the hydro-turbine unit to yield the requested output electrical power level to the electrical utility.

6. The interface of claim 5, wherein the rotary converter is coupled to the hydro-turbine such that ac frequency of the rotary converter is proportional to rotational velocity of the hydro-turbine unit.

7. The interface of claim 5, wherein the controller includes a processor which uses the signal indicative of water head to access a memory wherein Hydraulic Hill Chart information is stored.

8. The interface of claim 7, further comprising a Hill Chart updater to update values stored in the memory wherein Hydraulic Hill Chart information is stored.

9. The interface of claim 5, wherein the controller also uses a signal indicative of ac transmission frequency to the electrical utility to control the output power of the rotary converter for yielding the requested output electrical power level to the electrical utility.

10. The interface of claim 5, wherein the rotary converter comprises:
- one of a rotor and a stator connected to receive the hydro-turbine output electrical power;
- the other of the rotor and the stator being connected so that the converter output electrical power is extracted therefrom;
- an actuator for rotating the rotor; and
- wherein the controller is responsive to the signal indicative of water head for controlling the actuator whereby the rotor is bidirectionally rotated at a variable speed.

11. An interface for coupling a hydro-turbine unit to an electrical utility, the hydro-turbine unit having a hydraulic generator for generating hydro-turbine output electrical power which is transmitted via the interface to the electrical utility, the interface comprising:
- a rotary converter coupled to the hydro-turbine unit and which transmits electrical power to the electrical utility, the rotary converter comprising:
  - a rotor and a stator, one of the rotor and the stator being coupled to the hydro-turbine unit and the other of the rotor and stator being coupled to the electrical utility; and
  - a controller which uses ac frequency of the output electrical power for generating a signal for controlling rotational speed of the rotor relative to the stator.

12. The interface of claim 11, wherein the controller comprises:
- a frequency transducer which monitors ac frequency of the electrical utility and generates a signal $f_{ac}$ indicative thereof; and
- means for using the signal $f_{ac}$ generated by the frequency transducer to modify a signal $T_{go}$ indicative of a request rotional velocity of the hydro-turbine unit, the signal modifying means outputting a modified signal $T_o$ for use in controlling rotational speed of the rotor relative to the stator.

13. A hydroelectric power generation system which generates electrical power for an electrical utilization system, the hydroelectric power generation system comprising:
- a hydro-turbine unit which is driven by water flow, the hydro-turbine unit including a hydraulic generator which generates hydro-turbine output electrical power;
- a rotary converter coupled to receive the hydro-turbine output electrical power;
- a controller which operates the rotary converter so that a requested converter output electrical power level is obtained from the hydro-turbine unit, the controller using a signal indicative of water head to control speed and gate position of the hydro-turbine unit for yielding the requested converter output electrical power level to the utilization system.

14. The system of claim 13, wherein the rotary converter is coupled to the hydro-turbine unit such that ac frequency of the rotary converter is proportional to rotational velocity of the hydro-turbine unit.

15. The system of claim 13, wherein the controller includes a processor which uses the signal indicative of water head to access a memory wherein Hydraulic Hill Chart information is stored.

16. The system of claim 15, further comprising a Hill Chart updater to update values stored in the memory wherein Hydraulic Hill Chart information is stored.

17. The system of claim 13, wherein the controller also uses a signal indicative of ac transmission frequency to the electrical utility to control the output power of the rotary converter for yielding the requested converter output electrical power level to the electrical utility.

18. The system of claim 13, wherein the rotary converter comprises:
- one of a rotor and a stator connected to receive the hydro-turbine output electrical power;
- the other of the rotor and the stator being connected so that the requested converter output electrical power level is extracted therefrom;
- an actuator for rotating the rotor; and
- wherein the controller is responsive to the signal indicative of water head for controlling the actuator whereby the rotor is bidirectionally rotated at a variable speed.

19. A hydroelectric power generation system which generates electrical power for an electrical utilization system, the hydroelectric power generation system comprising:
- a hydro-turbine unit which is driven by water flow, the hydro-turbine unit including a hydraulic generator for generating hydro-turbine unit output electrical power; and
- a rotary converter coupled to the hydro-turbine and which transmits the hydro-turbine output electrical power to the electrical utilization system, the rotary converter comprising:
  - a rotor and a stator, one of the rotor and the stator being coupled to the hydro-turbine unit and the other of the rotor and stator being coupled to the electrical utilization system; and
  - a controller which uses ac frequency of the hydro-turbine output electrical power for generating a signal for controlling rotational speed of the rotor relative to the stator.

20. The system of claim 19, wherein the controller comprises:
- a frequency transducer which monitors ac frequency of the electrical utilization system and generates a signal $f_{ac}$ indicative thereof; and means for using the signal $f_{ac}$ generated by the frequency transducer to modify a signal $T_{go}$ indicative of a requested rotational velocity of the hydro-turbine unit, the signal modifying means outputting a modified signal $T_o$ for use in controlling rotational speed of the rotor relative to the stator.

* * * * *